July 22, 1952  R. H. HORNING  2,604,223
PREFORMED BOTTLE CAP
Filed June 6, 1951
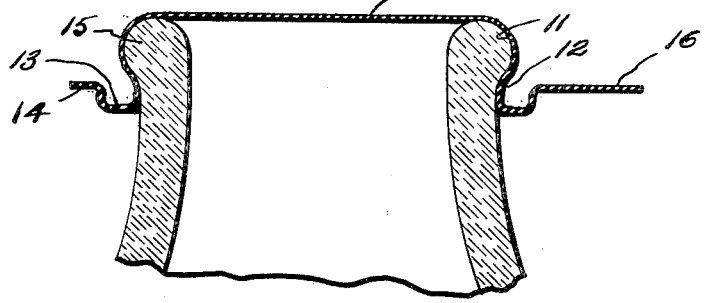
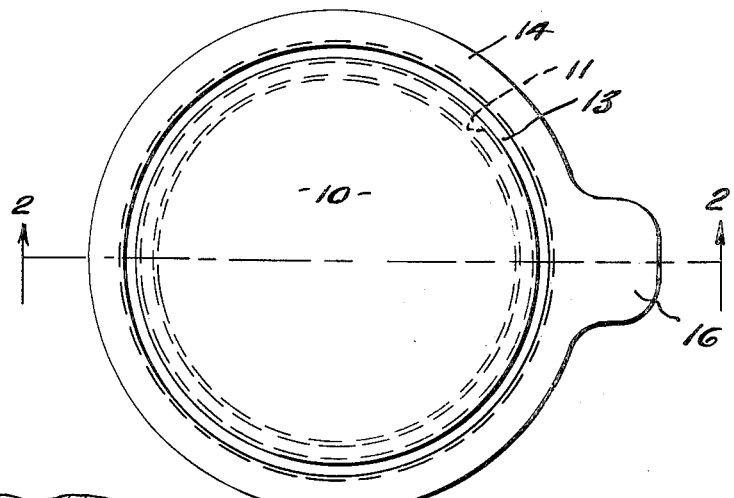
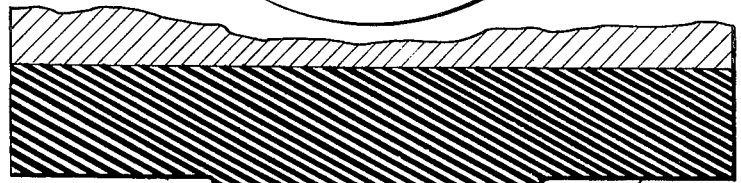
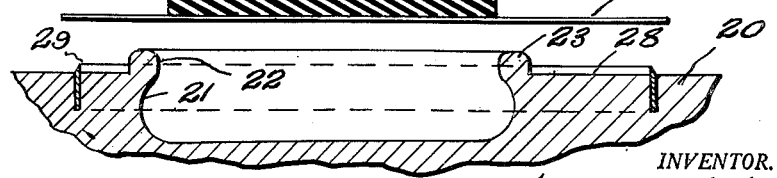
INVENTOR.
Raymond H. Horning
BY
Bodell & Thompson
ATTORNEYS.

Patented July 22, 1952

2,604,223

UNITED STATES PATENT OFFICE 2,604,223

PREFORMED BOTTLE CAP

Raymond H. Horning, Fulton, N. Y., assignor to Oswego Falls Corporation, Fulton, N. Y., a corporation of New York Application June 6, 1951, Serial No. 230,120

1 Claim. (Cl. 215—41)

This invention relates to bottle caps, and more particularly to bottle caps of the type pre-formed from heat and pressure moldable synthetic material. Heretofore, such caps have been pre-formed by being molded in a molding machine, the caps being of considerable thickness, or weight, and having a relatively short skirt encircled by a relatively heavy solid bead in order to cause the cap to snugly engage the top of the bottle and be retained thereon against accidental displacement. Such caps are only made in relatively small sizes for application to bottle tops employed in packaging expensive merchandise, such as drugs. This is because of the excessive amount of plastic material employed in forming the caps, and the expense of manufacture is further increased by the slow and costly molding process.

This invention has an object a bottle cap which, because of the peculiar structural arrangement, may be pre-formed from thin heat and pressure moldable synthetic sheet material, the forming operation being carried out with simple forming tools operated on a punch press, whereby the caps are formed in a web of sheet material at a speed with which the caps are pre-formed in volume production and yet, because of the unique structural arrangement, the caps snugly engage the bottle top in liquid tight relation, and may be removed and replaced on the bottle top a number of times without impairing the tenacity with which the caps are retained on the bottle tops.

The invention consists in the novel features and in the combinations and constructions hereinafter set forth and claimed.

In describing this invention, reference is had to the accompanying drawings in which like characters designate corresponding parts in all the views.

Figure 1 is a top plan view of a cap embodying my invention.

Figure 2 is a sectional view of the cap taken on line 2—2, Figure 1, and including the bottle top.

Figure 3 is a sectional view of a forming tool arrangement by which the cap may be manufactured.

The cap is pre-formed from a thin sheet of heat and pressure moldable synthetic material, such as polyethylene, in a suitable die to provide a flat discoidal portion 10 adapted to overlie the top or mouth of the bottle. The discoidal portion merges at its periphery into an annular bottle bead receiving channel 11. The lower side of the channel is connected to a cylindrical skirt portion 12 which terminates in an upwardly facing channel 13, the outer wall of which merges into an outwardly extending radial flange 14.

The bead receiving channel 11 is formed slightly less in diameter than the outer diameter of the bottle bead 15 and the skirt 12 is also of less diameter than the neck of the bottle immediately below the bead 15. The flange 14 may be formed with a radial extension 16 to form a tab which the cap may be more conveniently applied to the bottle and removed therefrom.

The skirt portion 12 is caused to be maintained in snug engagement with the neck of the bottle immediately below the bead thereof by the channel formation 13, the outer wall of which is restrained against radial outward movement by the radial flange 14. The channel 13 however, permits sufficient outward radial movement to allow the skirt portion of the cap to pass over the bead at the bottle top. The channel 13 exerts considerable pressure against the skirt portion 12 whereby the cap is retained on the top of the bottle during ordinary handling.

A forming tool arrangement by which the cap may be manufactured is illustrated in Figure 3, and consists of a die member 20 formed of rigid material, such as metal. The member 20 is formed with a concavity having an annular recess 21 complemental to the channel 11, and a bore 22 complemental to the skirt portion 12. The bore 22 is formed in an annular bead 23 encircling the open end of the concavity. A sheet 24 of the thin synthetic material is positioned over the die member 20. The sheet is preheated and the central portion of the sheet is drawn downwardly into the concavity of the die member by a punch member 25 formed of yieldable material, such as rubber. The punch member draws the heated plastic material into the concavity and, upon engagement of the central discoidal portion of the disk with the bottom of the concavity, further downward movement of the punch member causes the same to expand radially outwardly pressing the sheet material against the annular groove 21 and the bore 22. At this time, the marginal portion 26 of the punch member forms the peripheral portion of the disk about the bead 22 and the flat surface 28 of the die forming the flange 14. The concavity in the die member may be encircled by a knife member 29 formed to trim the periphery of the flange 14.

The forming tool arrangement above described serves as an efficient means for forming these caps in volume production. However, other forming arrangements may be employed. For example, the preheated synthetic material may be formed in the concavity of the die by the application of vacuum.

What I claim is:

A bottle cap pre-formed from a thin sheet of heat and pressure moldable synthetic material comprising a discoidal portion adapted to overlie the top of the bottle and merging at its periphery with a bottle bead receiving channel, a cylindrical skirt portion depending from said channel and forming the inner wall of an upwardly facing channel, the outer wall of said upwardly facing channel merging with an outwardly extending radial flange.

RAYMOND H. HORNING.

No references cited.